United States Patent
Ellis et al.

(10) Patent No.: US 7,463,581 B1
(45) Date of Patent: Dec. 9, 2008

(54) RE-ROUTING CONNECTIONS USING REDUNDANT PATH CONNECTIONS AND LOOPBACKS

(75) Inventors: John Ellis, Pleasanton, CA (US); Jan Medved, Pleasanton, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/499,871

(22) Filed: Feb. 7, 2000

(51) Int. Cl.
    *H04L 12/24* (2006.01)
(52) U.S. Cl. .................. 370/228; 370/395.1; 709/239
(58) Field of Classification Search ............. 370/217, 370/218, 225, 226, 227, 228, 397, 395.1; 714/2, 3, 4; 709/239
    See application file for complete search history.

(56) References Cited

U.S. PATENT DOCUMENTS

| | | | | |
|---|---|---|---|---|
| 5,398,236 A | * | 3/1995 | Hemmady et al. | 370/218 |
| 5,412,376 A | * | 5/1995 | Chujo et al. | 370/397 |
| 5,559,959 A |  | 9/1996 | Foglar | |
| 5,561,661 A |  | 10/1996 | Edmaier et al. | |
| 5,621,722 A | * | 4/1997 | Edmaier et al. | 370/390 |
| 5,627,822 A |  | 5/1997 | Edmaier et al. | |
| 5,671,215 A |  | 9/1997 | Foglar | |
| 5,715,237 A | * | 2/1998 | Akiyoshi | 370/228 |
| 5,838,924 A | * | 11/1998 | Anderson et al. | 709/239 |
| 5,848,055 A | * | 12/1998 | Fedyk et al. | 370/228 |
| 5,870,382 A | * | 2/1999 | Tounai et al. | 370/220 |
| 5,953,347 A |  | 9/1999 | Wong et al. | |
| 5,959,972 A | * | 9/1999 | Hamami | 370/228 |
| 5,978,120 A |  | 11/1999 | Dumortier | |
| 6,023,452 A | * | 2/2000 | Shiragaki | 370/227 |
| 6,041,037 A | * | 3/2000 | Nishio et al. | 370/228 |
| 6,075,767 A | * | 6/2000 | Sakamoto et al. | 370/228 |
| 6,222,820 B1 | * | 4/2001 | Hamami | 370/218 |
| 6,269,083 B1 | * | 7/2001 | Nagata et al. | 370/248 |
| 6,272,107 B1 | * | 8/2001 | Rochberger et al. | 370/216 |
| 6,320,860 B1 |  | 11/2001 | Hurlocker | |
| 6,359,857 B1 | * | 3/2002 | Ahmad et al. | 370/217 |
| 6,385,167 B1 | * | 5/2002 | Kamo | 370/228 |
| 6,426,941 B1 | * | 7/2002 | Vaman et al. | 370/228 |
| 6,452,934 B1 | * | 9/2002 | Nakata | 370/428 |
| 6,542,461 B1 |  | 4/2003 | Faye et al. | |
| 6,580,690 B1 | * | 6/2003 | Damien | 370/228 |

(Continued)

OTHER PUBLICATIONS

ITU-T Telecommunication Standardization Sector of ITU, Recommendation I.630, International Telecommunication Union, Series I: Integrated Services Digital Network Maintenance principles, ATM protection switching, pp. 1-36 (Feb. 1999).

(Continued)

*Primary Examiner*—Min Jung
(74) *Attorney, Agent, or Firm*—Blakely, Sokoloff, Taylor & Zafman LLP

(57) ABSTRACT

A method and apparatus are described for re-routing user connections between first and second nodes in a network switch. A loop-back path provides connectivity between the first and second nodes. The first node has a primary connection and a secondary connection. The primary connection carries the user connections during a normal mode. A switching element is coupled to the loop-back path and the first node to switch the connectivity from the primary connection to the secondary connection when there is a failure condition at the primary connection.

50 Claims, 4 Drawing Sheets

U.S. PATENT DOCUMENTS 6,614,792 B1 * 9/2003 Pazy et al. ............. 370/395.53
6,970,417 B1 * 11/2005 Doverspike et al. ......... 370/216
6,975,586 B1 * 12/2005 Yoshimura ................. 370/217
7,082,101 B2 * 7/2006 Kim et al. .................. 370/225

OTHER PUBLICATIONS

"Definition: Digital Loopback," http://www.atis.org/tg2k/_digital_loopback.html, 1 pg. (Aug. 25, 2004).

* cited by examiner

RE-ROUTING CONNECTIONS USING REDUNDANT PATH CONNECTIONS AND LOOPBACKS

FIELD OF THE INVENTION

This invention relates to computer networks. In particular, the invention relates to virtual path channel protection switching.

THE BACKGROUND OF THE INVENTION

One way of scaling large networks is to aggregate the channel connections carrying user traffic into the path channels. A failure of such aggregating path channels results in a need to re-route a large number of connections. Such a failure, referred to as channel connection outage, may lead to undesirable performance and reduces customers Quality of Service (QoS).

Traditional techniques to address the connection outage include the use multiple channel connections. However, the problem with using multiple channel connections is that significant time is required to re-route the user channel connections to a new path. Typically, the channel connections have to be removed and then re-established on the new path. When the number of connections is high, as is typical in a network, the time spent to re-establish the new path may reach several minutes. For service-oriented applications such as high availability applications, this outage time is undesirable.

SUMMARY OF THE INVENTION

A method and apparatus are described for re-routing user connections between first and second nodes in a network switch. A loop-back path provides connectivity between the first and second nodes. The first node has a primary connection and a secondary connection. The primary connection carries the user connections during a normal mode. A switching element is coupled to the loop-back path and the first node to switch the connectivity from the primary connection to the secondary connection when there is a failure condition at the primary connection.

Other features and advantages of the invention will be apparent from the detailed description and drawings provided herein.

BRIEF DESCRIPTION OF THE DRAWINGS

The present invention is illustrated by way of example and not limitation in the figures of the accompanying drawings in which like references indicated similar elements which.

DETAILED DESCRIPTION

A method and apparatus are described for re-routing user connections between first and second nodes in a network switch to reduce connection outage in the presence of a failure. A loop-back path provides connectivity between the first and second nodes. The first node has a primary connection and a secondary connection. The primary connection carries the user connections during a normal mode. A switching element is coupled to the loop-back path and the first node to switch the connectivity from the primary connection to the secondary connection when there is a failure at the primary connection. The loop-back path can be either a physical connection or a logical connection. The failure of the primary connection is detected by a network monitor, such as the operations, administration and maintenance (OAM) monitor or a call release procedure. In one embodiment, a connectivity monitor keeps track of a connectivity status between the first and second nodes. The connectivity status indicates end-to-end connections between the first and second nodes. The switching element switches the connectivity based on the connectivity status provided by the connectivity monitor. The secondary connection does not carry user connections during the normal mode, and therefore, does not use the network bandwidth. Typically, the primary and secondary connections have equal connection capacity.

In an embodiment, the network switch is an asynchronous transfer mode (ATM) switch where the primary and secondary connections correspond to a virtual path connection (VPC) in the ATM switch. In such an ATM network, the network monitor may be an operations, administration, and maintenance (OAM) monitor or a call release procedure.

The advantages of the present invention include reducing outages on user SPVC's and SVC's and simplifying topology of the network access.

In the following description, the notation # after a signal name indicates that the signal has an active LOW level, i.e., the signal is asserted when it has a logic LOW level. The description refers to the ATM model and the PCI bus as an interface example. It is contemplated that the technique is applicable to other models, buses, or network architectures with similar characteristics.

Figure 1:
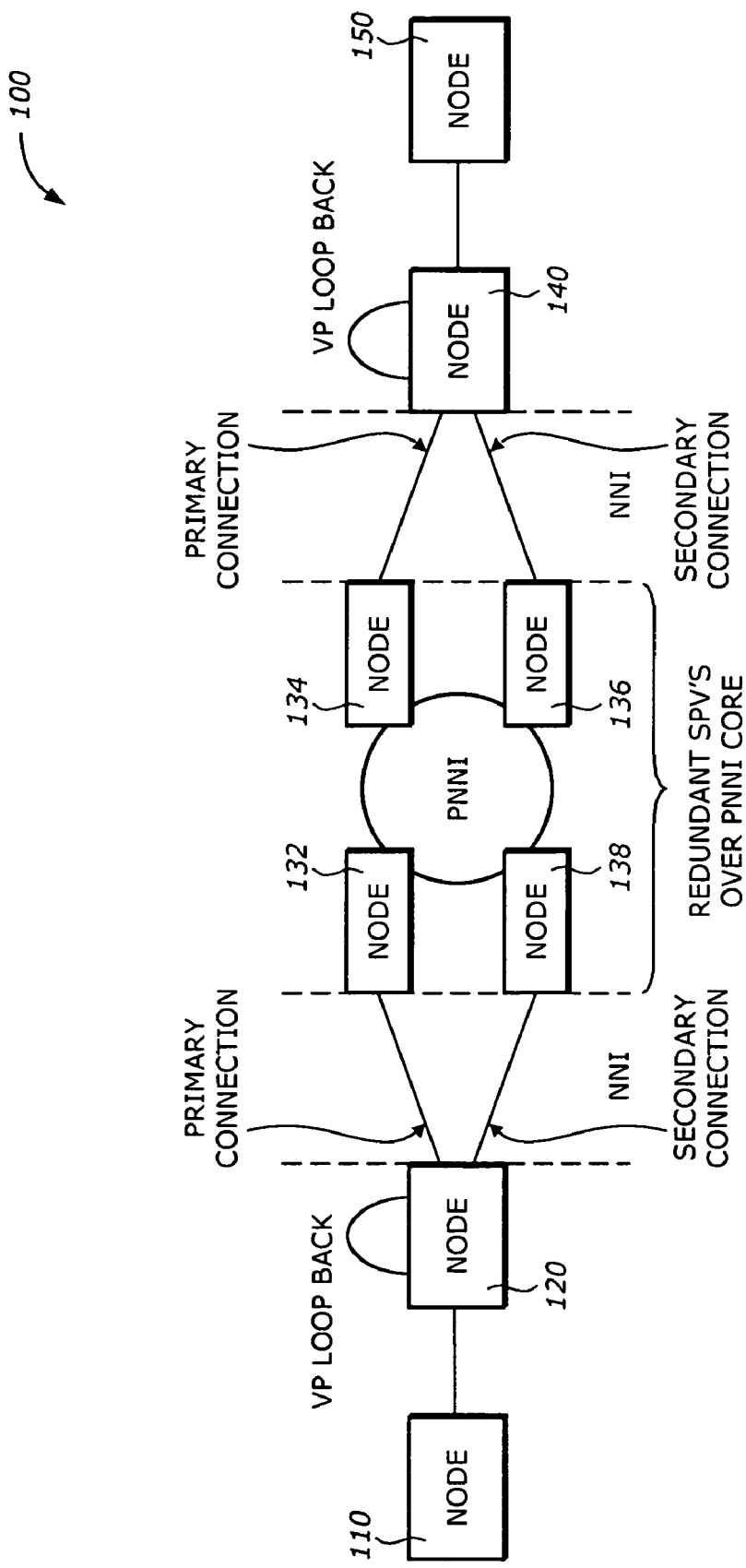
FIG. 1 shows a system in which one embodiment of the invention can be practiced.

FIG. 1 shows a system 100 in which one embodiment of the invention can be practiced. The system 100 includes nodes 110, 120, 132, 134, 136, 138, 140, and 150. The system 100 represents a switching network in a communication network. In one embodiment, the network is Asynchronous Transfer Mode (ATM) network.

Each of the nodes 110, 120, 132, 134, 136, 138, 140, and 150 is a switch that performs switching functions to provide connectivity. In one embodiment, each of the nodes is an ATM switch. The nodes 132, 134, 136, and 138 form redundant switched virtual paths (SVP's) over a private network to network interface (PNNI) core. The nodes 110 and 120, 140 and 150 form the edge connections. Over the network, there is a network monitor, such as the operations, administration and maintenance (OAM) monitor or a call release procedure to monitor the virtual path (VP) state.

The nodes 120 and 140 have virtual path (VP) loop back circuits that allow switching of user connections from a primary connection to a secondary connection in the PNNI core. For example, the nodes 132 and 134 may form a primary connection and the nodes 138 and 136 may form a secondary connection. The VP loop back circuits (nodes 120 and 140) receive information on the VP state to determine if there is a failure or a switching condition on the primary connection. If there is a failure, or there is some traffic condition that requires switching, the VP loop back circuits 120 and 140 switch the user connections from the primary connection to the secondary connection. During the normal mode, the secondary connection does not use the network bandwidth.

Therefore the bandwidth is not used for the secondary connection. Typically the primary and the secondary connections have equal capacity so that the user connections are not lost during the switch-over.

Figure 2:
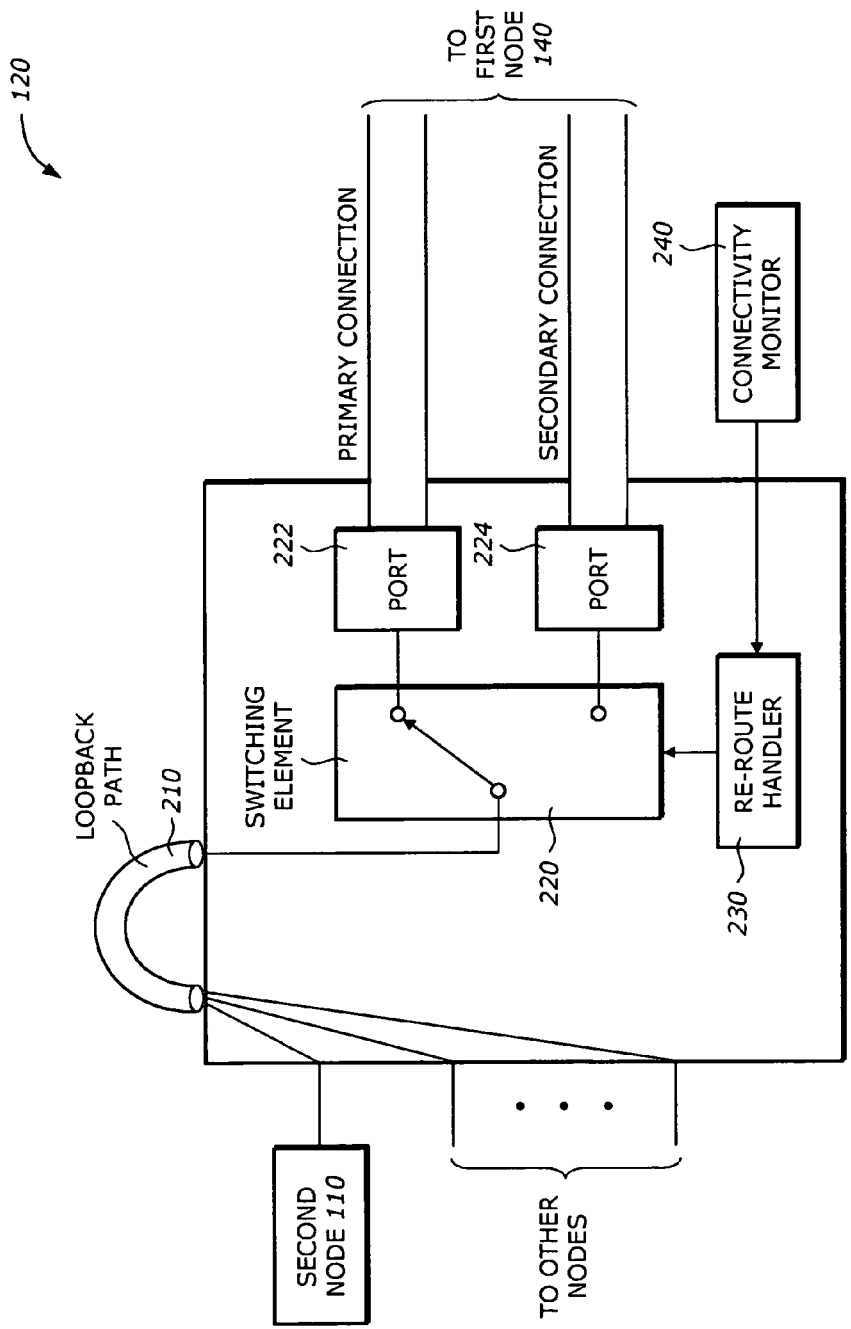
FIG. 2 shows a virtual path loop back circuit according to one embodiment of the invention.

FIG. 2 shows a virtual path loop back circuit 120 according to one embodiment of the invention. The VP loop back circuit 120 includes a loop back path 210, a switching element 220, ports 222 and 224, and a re-route handler 230. The VP loop back circuit 120 provides a loop-back path to provide connectivity between the first node 140 and the second node 110 using a connectivity monitor 240. Note that the virtual path loop back 140 also has a similar structure to provide connectivity between the node 120 and the node 150.

There are two connections between node 120 (the VP loop back circuit) and node 140: a primary connection and a secondary connection. The primary connection carries the user connections during a normal mode while the secondary connection carries the user connections during a failure mode. The secondary connection is set up or configured at the initialization phase to have essentially the same connection characteristics as the primary connection.

The loop back path 210 includes connection paths, either physical or logical, to connect the node 140 to the node 110. The switching element 220 is coupled to the loop-back path 210 and the node 140 via ports 222 and 224 to switch the connectivity from the primary connection to the secondary connection when there is a failure at the primary connection. The port 222 is connected to the primary connection and the port 224 is connected to the secondary connection. In one embodiment, the switching element 220 is an ATM switching fabric and the ports 222 and 224 are interface ports on an ATM line card.

The re-route handler 230 receives the connection status on the primary connection and controls the switching element 220 to switch from the primary node to the secondary node in case of failure. The reroute handler 230 receives the connectivity status from the connectivity monitor 240. The connectivity monitor 240 may be part of an OAM procedure or a call release procedure. The connectivity monitor 240 keeps track of a connectivity status between nodes 140 and node 110. The connectivity status indicates end-to-end connections between the nodes 140 and node 110.

Figure 3:
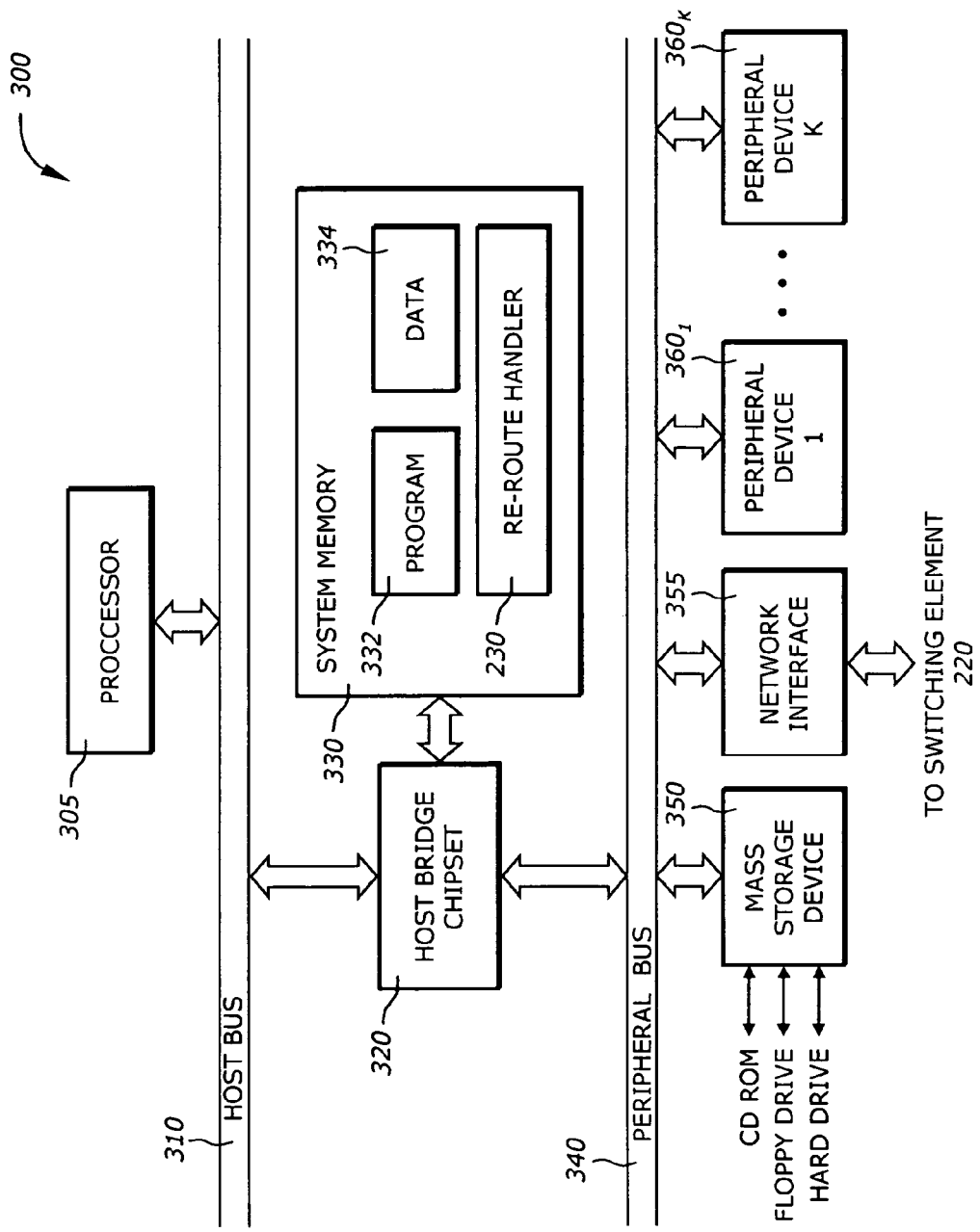
FIG. 3 shows a computer system to perform switching for the loopback path according to one embodiment of the invention.

FIG. 3 shows a computer system 300 to perform switching for the loop-back path according to one embodiment of the invention. The computer system 300 may be used as part of an ATM switch, a host machine, a workstation, a LAN, and any other system or subsystem connected to the network. The computer system 300 include a processor 305, a host bus 310, a host bridge chipset 320, a system memory 330, a peripheral bus 340, a mass storage device 350, a network interface device 355, and K peripheral devices $360_1$ to $360_K$.

The processor 305 represents a central processing unit of any type of architecture, such as an embedded micro-controller, a general-purpose processor, a digital signal processor, complex instruction set computers (CISC), reduced instruction set computers (RISC), very long instruction word (VLIW), explicitly parallel instruction set computing (EPIC), or hybrid architecture. The invention could be implemented in a multi-processor or single processor computer system.

The host bridge chipset 320 includes a number of interface circuits to allow the host processor 305 access to the system memory 330 and the peripheral bus 340. The host bridge chipset 320 may include a memory controller, a bus interface circuit, and an I/O controller. The memory controller provides an interface to the system memory 330. The I/O controller provides control of I/O functions.

The system memory 330 represents one or more mechanisms for storing information. For example, the system memory 330 may include non-volatile or volatile memories. Examples of these memories include flash memory, read only memory (ROM), or random access memory (RAM). The system memory 330 contains a program 332, a data storage 334, and the re-route handler 230 as shown in FIG. 2. The re-route handler 230 is a program code or functions to control the switching element 220 in FIG. 2 to switch the user connections from a primary connection to a secondary connection based on a connection status such as a failure on the primary connection. Of course, the system memory 330 preferably contains additional software (not shown), which is not necessary to understanding the invention.

The peripheral 340 provides bus interface to the mass storage device 350, the network interface 355, and the peripheral devices $360_1$ to $360_K$. In one embodiment, the peripheral bus 360 is the peripheral component interconnect (PCI) bus.

The mass storage device 350 include CD ROM, floppy diskettes, and hard drives. The mass storage device 350 stores non-volatile information such as programs or data. The mass storage device 350 provides a mechanism to read machine-readable media. When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

The network interface device 355 provides interface to a network such as ATM, LAN, WAN, etc. In one embodiment, the network interface device 355 provides interface to an ATM switching fabric acting as the switching element 220 shown in FIG. 2. The peripheral devices $360_1$ to $360_K$ may include an audio device, a multimedia device, a modem, a printer controller, etc.

Figure 4:
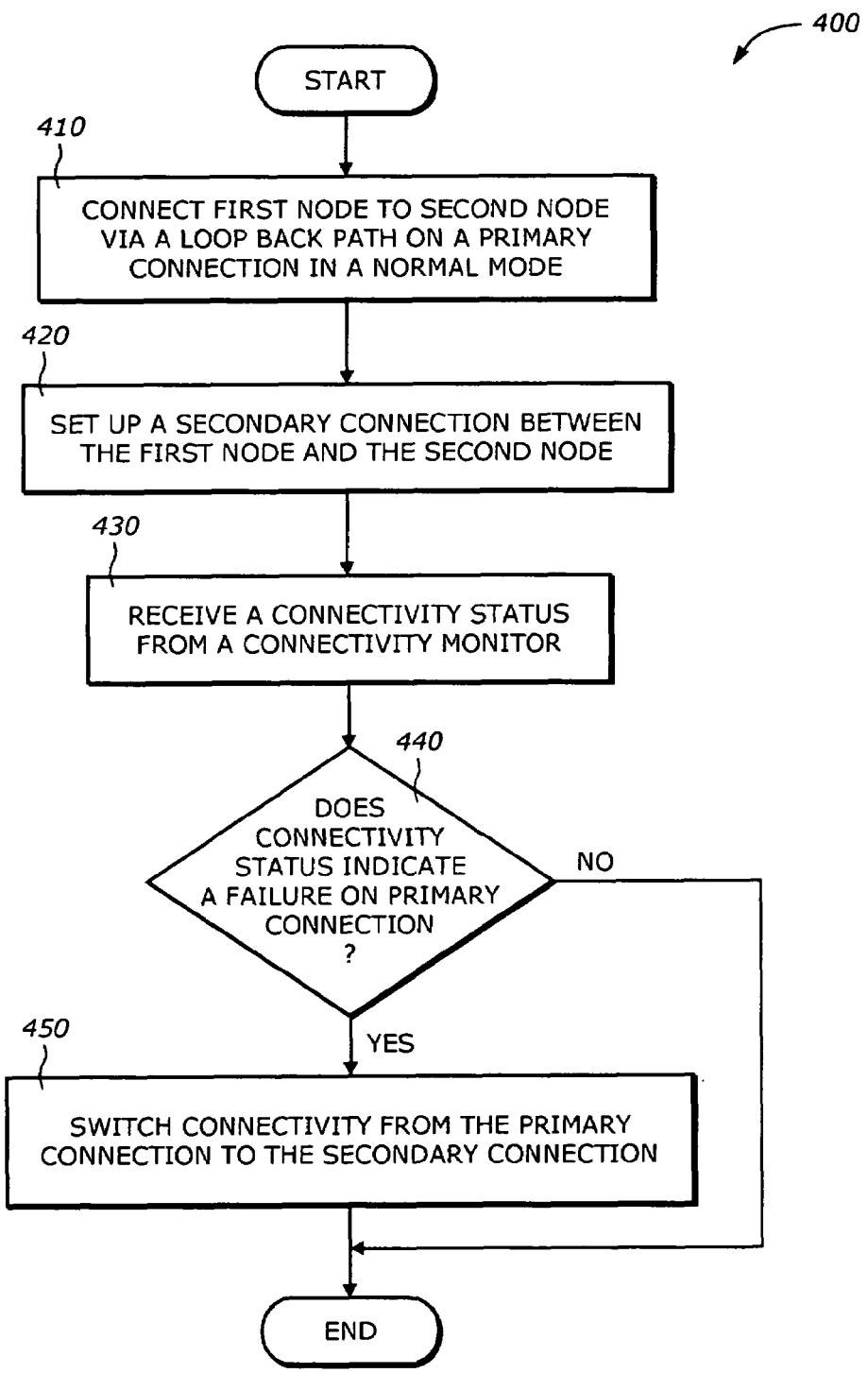
FIG. 4 shows a flowchart for a process to re-route connections.

FIG. 4 shows a flowchart for a process 400 to re-route connections.

Upon START, the process 400 connects the first node to the second node via a virtual loop back path on a primary connection during a normal mode (Block 410). Then, the process 400 sets up or configures a secondary connection between the first node and the second node (Block 420). Then the process 400 receives a connectivity status from a network monitor (Block 430).

Next, the process 400 determines if the connectivity status indicates that there is a failure condition at the primary connection (Block 440). If there is no failure condition, the process 400 is terminated. If there is a failure condition, the process 400 switches the connectivity from the primary connection to the secondary connection (Block 450). Then the process 400 is terminated.

A technique has been described to re-route user connections between first and second nodes in a network switch. A loop-back path provides connectivity between the first and second nodes. The first node has a primary connection and a secondary connection. The primary connection carries the user connections during a normal mode. A switching element is coupled to the loop-back path and the first node to switch the connectivity from the primary connection to the secondary connection when there is a failure condition at the primary connection.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus for re-routing user connections between first and second nodes in a network switch, the apparatus comprising:
   a loop-back path to provide connectivity between the first and second nodes, the first node having a primary connection and a secondary connection, the primary connection carrying the user connections during a normal mode, the secondary connection not using network bandwidth during the normal mode; and
   a switching element coupled to the loop-back path and the first node to connect the loop-back path to the primary connection during the normal mode and to the secondary connection when there is a failure condition at the primary connection.

2. The apparatus of claim 1 wherein the loop-back path is one of a physical connection and a logical connection.

3. The apparatus of claim 1 wherein the failure condition is detected by a network monitor.

4. The apparatus of claim 3 further comprising:
   a re-route handler coupled to switching element to control the switching element based on a connectivity status between the first and second nodes, the connectivity status indicating the failure condition at the primary connection between the first and second nodes.

5. The apparatus of claim 4 wherein the switching element switches the connectivity based on the connectivity status provided by the network monitor.

6. The apparatus of claim 1 wherein the secondary connection does not carry user connections during the normal mode.

7. The apparatus of claim 1 wherein the network switch is an asynchronous transfer mode (ATM) switch.

8. The apparatus of claim 7 wherein the primary and secondary connections correspond to a virtual path connection (VPC) in the ATM switch.

9. The apparatus of claim 3 wherein the network monitor is one of an operations, administration, and maintenance (OAM) monitor and a call release procedure.

10. The apparatus of claim 9 wherein the primary and secondary Connections have equal connection capacity.

11. A method for re-muting connections between first and second nodes in a network switch, the method comprising:
    connecting the first and second nodes by a loop-back path, the first node having a primary connection and a secondary connection, the primary connection carrying user connections during a normal mode, the secondary connection not using network bandwidth during the normal mode; and
    connecting the loop-back path to the primary connection during the normal mode and to the secondary connection by a switching element when there is a failure condition at the primary connection.

12. The method of claim 11 wherein the loop-back path is one of a physical connection and a logical connection.

13. The method of claim 11 wherein the failure condition is detected by a network monitor.

14. The method of claim 13 further comprising:
    controlling the switching element by a re-route handler based on a connectivity status between the first and second nodes provided by the network monitor, the connectivity status indicating the failure condition at the primary connection between the first and second nodes.

15. The method of claim 14 wherein the switching element switches the connectivity based on the connectivity status provided by the network monitor.

16. The method of claim 11 wherein the secondary connection does not carry user connections during the normal mode.

17. The method of claim 11 wherein the network switch is an asynchronous transfer mode (ATM) switch.

18. The method of claim 17 wherein the primary and secondary connections correspond to a virtual path connection (VPC) in the ATM switch.

19. The method of claim 13 wherein the network monitor is one of an operations, administration, and maintenance (OAM) monitor and a call release procedure.

20. The method of claim 19 wherein the primary and secondary connections have equal connection capacity.

21. A computer program product comprising:
    a computer storage medium having computer program code embodied therein for rerouting connections between first and second nodes in a network switch, the computer program product having:
        computer readable program code for connecting the first and second nodes by a loop-back path, the first node having a primary connection and a secondary connection, the primary connection carrying user connections during a normal modes the secondary connection not using network bandwidth during the normal mode; and
        computer readable program code for connecting the loop-back path to the primary connection during the normal mode and to the secondary connection by a switching element when there is a failure condition at the primary connection.

22. The computer program product of claim 21 wherein the loop-back path is one of a physical connection and a logical connection.

23. The computer program product of claim 22 wherein the failure condition is detected by a network monitor.

24. The computer program product of claim 23 further comprising:
    computer readable program code for controlling the switching element by a re-route handler based on a connectivity status between the first and second nodes provided by the network monitor, the connectivity status indicating the failure condition at the primary connection between the first and second nodes.

25. The computer program product of clam 24 wherein the switching element switches the connectivity based on the connectivity status provided by the network monitor.

26. The computer program product of claim 21 wherein the secondary connection does not carry user connections during the normal mode.

27. The computer program product of claim 21 wherein the network switch is an asynchronous transfer mode (ATM) switch.

28. The computer program product of claim 27 wherein the primary and secondary connections correspond to a virtual path connection (VPC) in the ATM switch.

29. The computer program product of claim 23 wherein the network monitor is one of an operations, administration, and maintenance (OAM) monitor and a call release procedure.

30. The computer program product of claim 29 wherein the primary and secondary connections have equal connection capacity.

31. A system comprising:
  first and second nodes to carry user connections in a network switch; and
  a circuit coupled to the first and second nodes to re-route the user connections between first and second nodes, the circuit comprising:
    a loop-back path to provide connectivity between the first and second nodes, the first node having a primary connection and a secondary connection, the primary connection carrying the user connections during a normal mode, the secondary connection not using network bandwidth during the normal mode; and
    a switching element coupled to the loop-back path and the first node to connect the loop-back path to the primary connection during the normal mode and to the secondary connection when there is a failure condition at the primary connection.

32. The system of claim 31 wherein the loop-back path is one of a physical connection and a logical connection.

33. The system of claim 31 wherein the failure condition is detected by a network monitor.

34. The system of claim 33 wherein the circuit further comprises:
  a re-route handler coupled to the switching element to control the switching element based on a connectivity status between the first and second nodes, the connectivity status indicating the failure condition at the primary connection between the first and second nodes.

35. The system of claim 34 wherein the switching element switches the connectivity based on the connectivity status provided by the network monitor.

36. The system of claim 31 wherein the secondary connection does not carry user connections during the normal mode.

37. The system of claim 31 wherein the network switch is an asynchronous transfer mode (ATM) switch.

38. The system of claim 37 wherein the primary and secondary connections correspond to a virtual path connection (VPC) in the ATM switch.

39. The system of claim 33 wherein the network monitor is one of an operations, administration, and maintenance (OAM) monitor and a call release procedure.

40. The system of claim 39 wherein the primary and secondary connections have equal connection capacity.

41. An apparatus for re-routing connections between first and second nodes in a network switch, the apparatus comprising:
  means for connecting the first and second nodes by a loop-back path, the first node having a primary connection and a secondary connection, the primary connection carrying user connections during a normal mode, the secondary connection not using network bandwidth during the normal mode; and
  means for connecting the loop-back path to the primary connection during the normal mode and to the secondary connection when there is a failure condition at the primary connection.

42. The apparatus of claim 41 wherein the loop-back path is one of a physical connection and a logical connection.

43. The apparatus of claim 41 wherein the failure condition is detected by a network monitor.

44. The apparatus of claim 43 further comprising:
  means for controlling the switching by a re-route handler based on a connectivity status between the first and second nodes provided by the network monitor, the connectivity status indicating the failure condition at the primary connection between the first and second nodes.

45. The apparatus of claim 44 wherein the means for switching switches the connectivity based on the connectivity status provided by the network monitor.

46. The apparatus of claim 41 wherein the secondary connection does not carry user connections during the normal mode.

47. The apparatus of claim 41 wherein the network switch is an asynchronous transfer mode (ATM) switch.

48. The apparatus of claim 47 wherein the primary and secondary connections correspond to a virtual path connection (VPC) in the ATM switch.

49. The apparatus of claim 43 wherein the network monitor is one of an operations, administration, and maintenance (OAM) monitor and a call release procedure.

50. The apparatus of claim 49 wherein the primary and secondary connections have equal connection capacity.

* * * * *